United States Patent [19]
Kashii et al.

[11] Patent Number: 5,511,983
[45] Date of Patent: Apr. 30, 1996

[54] GRAPHIC IMAGE GENERATING APPARATUS WITH AUTOMATIC DEMONSTRATION IMAGE GENERATING PROGRAM

[75] Inventors: Masaharu Kashii, Kanagawa; Nae Yasuhara, Tokyo; Hiroko Kusano, Kanagawa, all of Japan

[73] Assignee: Sony Corporation, Tokyo, Japan

[21] Appl. No.: 66,347

[22] Filed: May 24, 1993

[30] Foreign Application Priority Data

May 29, 1992 [JP] Japan .................................... 4-161826

[51] Int. Cl.$^6$ ..................................................... G06F 17/00
[52] U.S. Cl. ........................... 434/365; 434/81; 395/161; 345/179; 345/122
[58] Field of Search ..................................... 395/154, 155, 395/157, 153, 152, 161; 345/122, 133, 150, 201, 115, 116, 122; 364/705.01, 226.2, 227.1, 916.5, 920.1, 927.7; 353/30; 434/81, 126, 393, 85, 307 R, 118, 365

[56] References Cited

U.S. PATENT DOCUMENTS

| | | | |
|---|---|---|---|
| 4,633,416 | 12/1986 | Walker | 364/521 |
| 4,764,763 | 8/1988 | Wickstead et al. | 340/709 |
| 4,841,291 | 6/1989 | Swix et al. | 340/725 |
| 4,952,051 | 8/1990 | Lovell et al. | 352/87 |
| 4,958,147 | 9/1990 | Kanema | 340/706 |
| 5,404,437 | 4/1995 | Nguyen | 395/152 |

Primary Examiner—Heather R. Herndon
Assistant Examiner—Joseph H. Feild
Attorney, Agent, or Firm—Limbach & Limbach; W. Patrick Bengtsson

[57] ABSTRACT

An image generating apparatus for preparing a drawing using an image display apparatus. The image generating apparatus has a power source turn-on detection unit for instructing starting of an image forming program for forming a series of consecutive images previously stored in a ROM. When the power turn-on detection unit detects power source turn-on, a power turn-on detection signal is transmitted via an I/O interface to a central processing unit, which then reads a demonstration program from the ROM to start displaying the demonstration image on a display. When the coordinate detection unit and the key switch pressing detecting unit detect the pressure information on buttons on a tablet and key switches, the pressure information is transmitted via the I/O interface to the central processing unit. Under control by the central processing unit, the execution of the image generating program is interrupted and image data formed up to that time is maintained in RAM to enable image data formed by a trajectory drawn on the tablet to be added to the image data maintained in RAM.

12 Claims, 5 Drawing Sheets

GRAPHIC IMAGE GENERATING APPARATUS WITH AUTOMATIC DEMONSTRATION IMAGE GENERATING PROGRAM

BACKGROUND OF THE INVENTION

This invention relates to a graphic image apparatus for preparing a drawing using an image display unit. More particularly, it relates to a graphic image generating apparatus in which a new image may be added to a demonstration image being prepared and automatically displayed on the image display unit.

Heretofore, pictures were drawn for play by children on drawing sheets using crayons or color pencils. However, in this case, correction can be made only with difficulties in case of an error, while pictures could not be drawn freely because of limitation in the number of drawing sheets available to them.

Thus an image generating apparatus has been proposed which consists in a combination of a tablet provided with a coordinate detection device, a personal computer having a software for processing input coordinate data and a display for displaying image data generated by the personal computer, and which is adapted for displaying a trajectory drawn on the tablet on a display screen. In this case, the image displayed on the display screen may be corrected easily, while the image may be drawn again and again at the will of the user.

If a storage means is provided for storing a demonstration program, a demonstration display may be made on the display screen in the same way as when the user is drawing a trajectory on a tablet, by having the program executed at the user's premises or at a store, whenever a power source is turned on, for explanation of the method of using the image generating apparatus.

However, in the previously proposed device, if, during the time when the demonstration program is executed for demonstration display, the demonstration display is terminated by button operation by the user, the personal computer is set to a drawing mode, in which the demonstration image on the display is erased in its entirety.

This demonstration display is made so that a trajectory is drawn on the display screen in the same way as when a trajectory is drawn on the tablet by the user. Such a demonstration display represents a model after which the user may learn how to prepare a desired drawing, especially if the user is a child or is unaccustomed to the use of the apparatus. For example, if the user, who is a child, adds his own picture to an uncompleted model to complete it, the picture may be rendered variable to help nourish the creative mind of the user. However, if the demonstration display mode is interrupted, the image so far displayed on the screen is erased so that it has not been possible for the user to add his own picture to the displayed image to complete it.

OBJECT AND SUMMARY OF THE INVENTION

In view of the above-described status of the art, it is an object of the present invention to provide an image generating apparatus in which, even if the program for demonstration display, automatically executed by turning on a power source, is interrupted, the user may arbitrarily add his own picture to the demonstration image displayed on the display screen.

The graphic image generating apparatus according to the present invention comprises a coordinate position information inputting means for generating coordinate information by a manual operation by user, coordinate detection means for generating first coordinate signals from the coordinate information, first storage means for storing data based on the first coordinate signals, a image processor for generating video data from data from the first storage means, image storage means for storing the image data, output means for outputting data from the image storage means to a display, a central processing unit, and second storage means for storing an image generating program indicating a sequence of operations for generating continuous images.

The central processing unit sequentially generates second coordinate signals based on execution of the image generating program. The second coordinate signals read from the second storage means are stored in the first storage means. The image storage means for storing the image data store both the image data generated based on the first coordinate signals outputted by the coordinate detection unit and the image data generated based on the second coordinate data generated based on the second coordinate signals outputted by the second storage unit for displaying the image based on the first coordinate signals and the image based on the second coordinate signals on the display screen simultaneously.

When the image generating program is started by the starting means, the central processing unit causes the apparatus to proceed to a demonstration graphic image generating mode. When the execution of the image generating program is terminated by means for terminating the execution of the image generating program, the central processing unit causes the image automatically generated by program execution up until the time of termination to be held by the image storage means, while causing the apparatus to proceed to a manual data inputting mode, thereby enabling an image based on coordinate data entered by manual operation via the coordinate position input means to be added to the image storage means.

That is, if, in the graphic image generating apparatus according to the present invention, the execution of the image generating program is interrupted by the interrupting means for interrupting the execution of the image generating program, an image may be added by a manual operation via image input means to an image which has automatically been generated up until the time of interruption and displayed on the display.

Other objects and advantages of the present invention will become apparent from the following description of the preferred embodiment and the claims.

DETAILED DESCRIPTION OF THE PREFERRED EMBODIMENT

Figure 1:
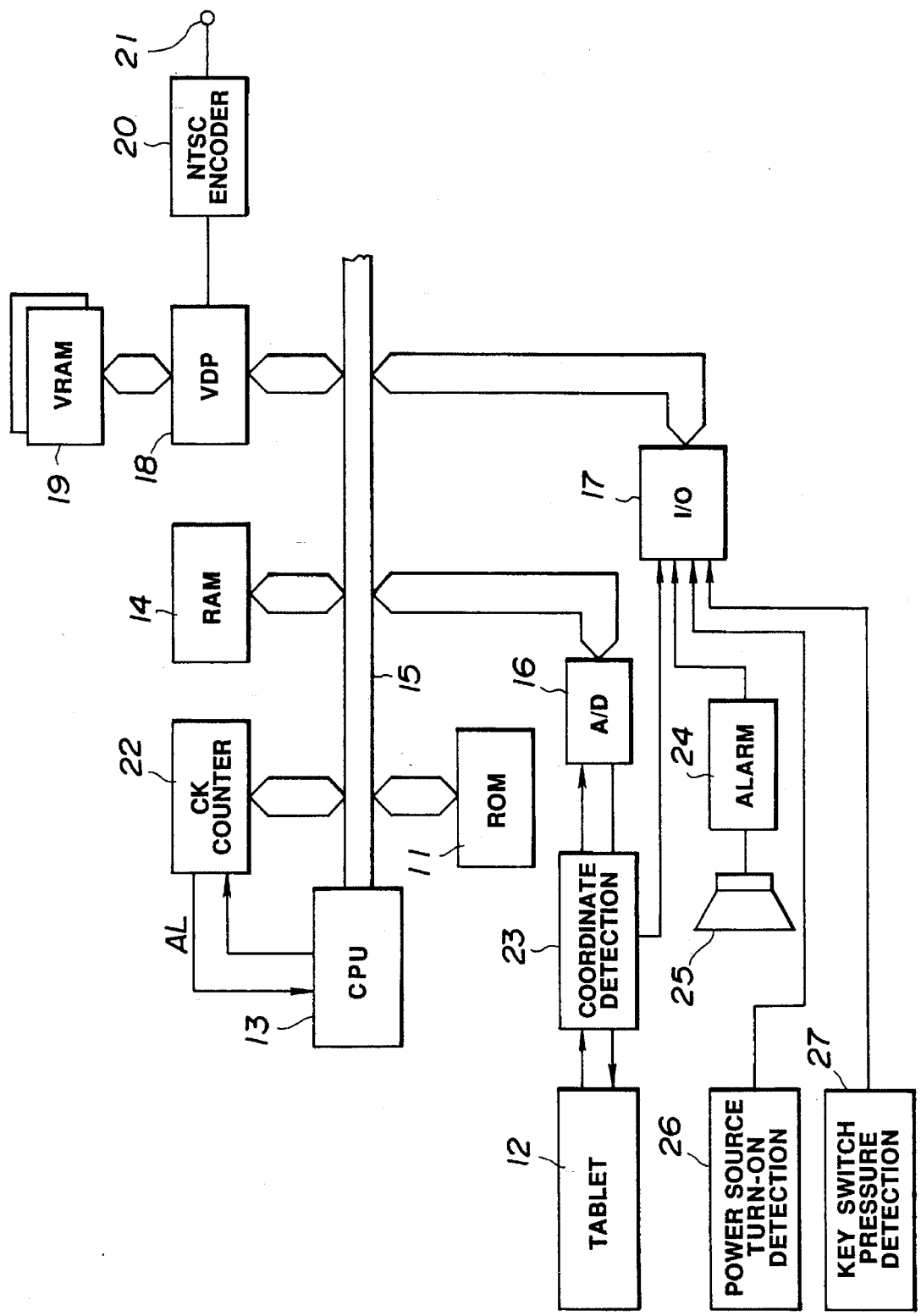
FIG. 1 is a block circuit diagram showing a circuit arrangement of a graphic image generating apparatus embodying the present invention.

By referring to the drawings, the graphic image generating apparatus embodying the present invention is explained in detail.

In the present embodiment, the present invention is applied to a graphic computer employed by children for preparing drawings for play.

The circuit arrangement of the present embodiment is first explained by referring to the block circuit diagram shown in FIG. 1.

Referring to FIG. 1, the graphic image generating apparatus according to the invention is shown. A tablet 12, as a coordinate position information inputting means, generates trajectory coordinate information by a manual operation by user, e.g. by pressing with a stylus on the tablet. A coordinate detection circuit 23 connected to the tablet 12 generates first trajectory coordinate signals from the trajectory coordinate information. A RAM 14, as a first storage means, stores data based on the first trajectory coordinate signals. A video processor (VDP) 18 generates image data from data from the first storage means (RAM) 14. A VRAM 19, as image storage means, stores the image data. A monitor 81 (FIG. 2), as a display means, displays a video image in the form of a trajectory based on data from the image storage means (VRAM) 19.

A central processing unit 13, in addition to controlling all of the units shown and processing other information, processes an automatic demonstration image generating program which is stored in a ROM 11. The automatic demonstration image generating program is a sequence of operations for automatically generating a series of continuous, demonstration trajectory images. The central processing unit 13 sequentially generates second trajectory coordinate signals based on execution of the automatic demonstration image generating program. The image storage means (VRAM) 19 stores both image data generated on the basis of the first trajectory coordinate signals and image data generated on the basis of the second trajectory coordinate signals and the display 81 simultaneously displays all of the generated image data stored in the image storage means (VRAM) 19.

An NTSC encoder 20 acts as an output means for outputting data from the image storage means (VRAM) 19 to the display 81. A power source turn-on detection unit 26, as an initiating means, causes the CPU 13 to begin executing the automatic demonstration image generating program on power up of the device. A key-switch pressure detection unit 27, as a terminating means, causes the CPU 13 to terminate execution of the automatic demonstration image generating program.

To CPU 13 is connected a system bus 15 made up of a data bus, an address bus and a control bus. To system bus 15 is connected ROM 11 which stores, besides the above-mentioned sequence of steps of the image-generating program, a program for processing in CPU 13. To system bus 15 is also connected RAM 14. In addition, to system bus 15 are also connected an analog/digital (A/D) converter 16 for converting analog signals, obtained by detecting input coordinates to tablet 12, into digital signals, an input/out, put (I/O) interface 17, as an interface between power turn-on detecting unit 26 as initiating means and key switch pressure detection unit 27 as terminating means, on one hand, and CPU 13 on the other hand, a video processor (VDP) 18 and a counter 22 for generating alarm signals based on clock pulses and clear pulses from CPU 13 and transmitting the resulting alarm signals to CPU 13. The video processor 18 reads image data from RAM 14 under control by CPU 13 to write the data in a 2-frame capacity RAM for video signals (VRAM) 19, as image storage means, while periodically reading 1-frame of image data from VRAM 19 for supplying the read out image data to an NTSC encoder 20.

To tablet 12 is connected a coordinate detection unit 23 for detecting an input coordinate on an X-Y coordinate system of a locus of movement drawn by manually pressing the tablet 12 and for generating first coordinate signals based on the detected coordinate information. The coordinate detection unit 23 is connected to the A/D converter 16.

To the I/O interface 17 is connected, besides the coordinate detecting unit 23, the power turn-on detecting unit 26 instructing the initiation of execution of the image-generating program stored in ROM 11 and the key switch pressure detecting unit 27, an alarming circuit 24 made up of a timer, an oscillator, synthesizer and a power amplifier. To the alarming circuit 24 is connected a speaker 25.

The key switch, the pressure on which is detected by the key switch pressure detection unit 27, means a cancellation button, a speech adjustment unit, a clear button and left and right execution buttons adapted to execute the respective functions.

The inner structure of the image generating apparatus of the present embodiment is hereinafter explained.

Figure 2:
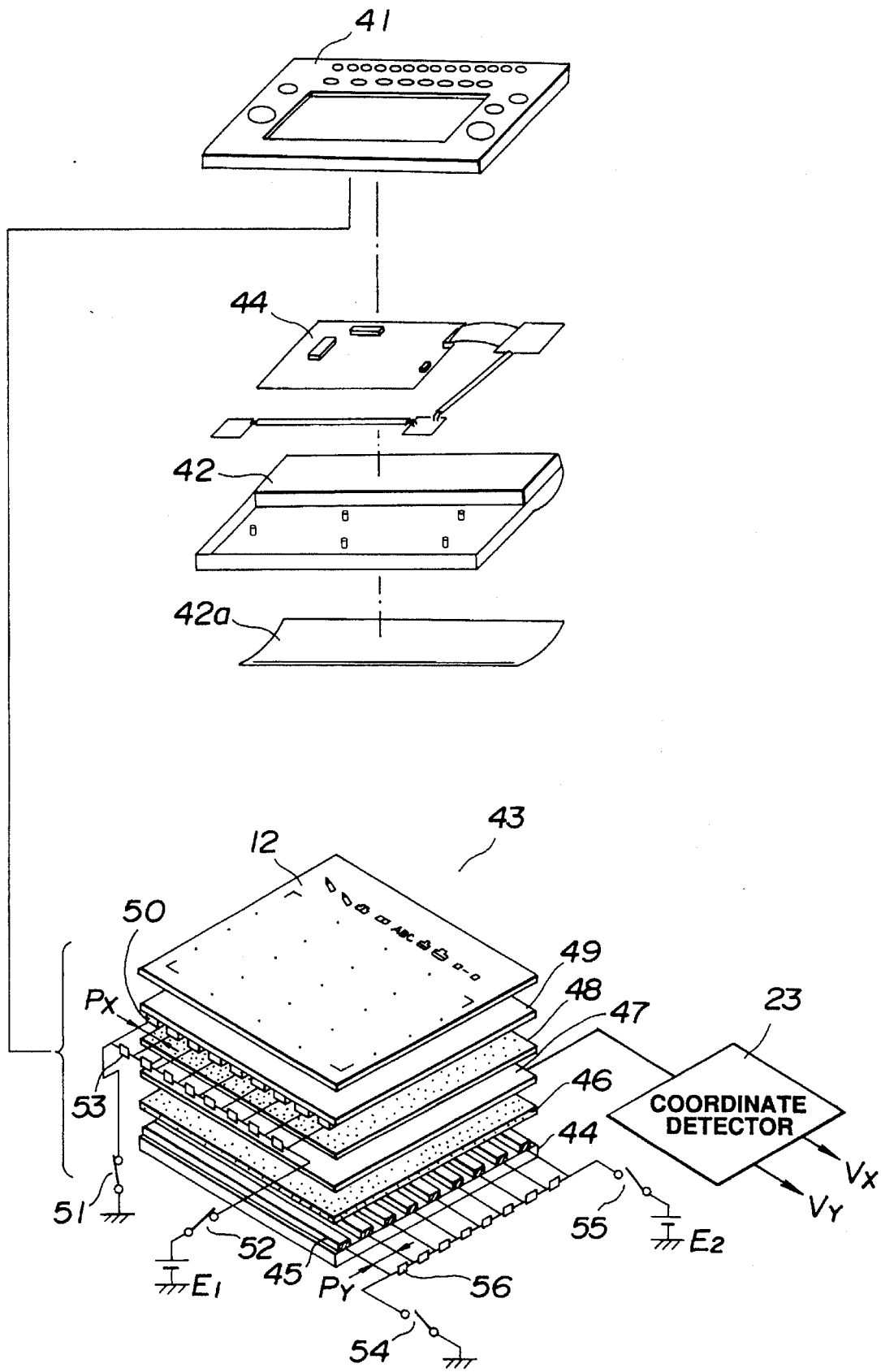
FIG. 2 is an exploded perspective view showing the graphic image generating apparatus shown in FIG. 1.

Within the image generating apparatus, a pressure sensitive type position detection unit 43 inclusive of the tablet 12 and a printed circuit board 44 are sandwiched between an upper casing 41 and a lower casing 42, as shown in FIG. 2. Dry cells or chargeable cells as a power source are housed within the lower casing 42 to which is attached a cover 42a.

The pressure sensitive type pressure detecting unit 43 includes a first insulating substrate 44, on which fine strip-like electrodes 45 are formed at a pitch $P_Y$. Stacked in order from bottom to top as viewed in FIG. 2. On this first insulating substrate 44 are a first pressure sensitive electrically conductive sheet 46 of a pressure sensitive electrically conductive rubber, an electrical conductive sheet 47, a second pressure sensitive electrically conductive sheet 48 of a pressure sensitive electrically conductive rubber, and a second electrical insulating substrate 49, on which fine strip-like electrodes 50 are formed at a pitch $P_X$. The tablet 12 is placed on the second electrically insulating substrate 49. The electrically conductive substrate 47, the second electrically insulating sheet 49 and the tablet 12 exhibit certain flexibility. The resolution along the X-axis of input coordinates of the pressure sensitive position detection unit 43 is $P_X$, while that along the Y-axis is $P_Y$, with the ratio $P_X:P_Y$ being set so as to be equal to the pixel ratio of an ordinary monitor raster. The resolution $P_X:P_Y$ may for example be on the order of 0.3 mm.

The electrode 50 on one transverse end of the second electrically insulating substrate 49 is grounded via a switching circuit 51, while the electrode 50 on the opposite transverse end of the substrate 49 is connected to a dc power source $E_1$ via a switching circuit 52. The electrodes 50 in their entirety are sequentially connected to one another and to the dc voltage source and the ground via series connected resistors 53 of the same resistance value. Similarly, the electrode 45 on one longitudinal end of the first electrically insulating substrate 44 is grounded via a switching circuit 54, while the electrode 45 on the opposite longitudinal end of the substrate 44 is connected to a dc power source $E_2$ via a switching circuit 55. The electrodes 45 in their entirety are sequentially connected to one another and to the dc voltage source and the ground via series connected resistors 56 of the same resistance value. When a certain point on the tablet 12 is pressed, the pressure sensitive electrically conductive sheets 46, 48 are rendered electrically conductive at the thrust points, so that a voltage corresponding to an X-axis coordinate is produced in the electrically conductive sheet 47 by closure of the switch circuit 51, 52, while a voltage corresponding to a Y-axis coordinate is produced in the electrically conductive sheet 47 by closure of the switch circuit 54, 55. The coordinate detection unit 23 is connected to the electrically conductive sheet 47 for alternately closing the switch circuits 51, 52 or 54, 55 and holding the volt ages produced in the electrically conductive sheet 47 for generating voltages $V_X$, $V_Y$ associated with input coordinates X, Y of the tablet 12.

Figure 3:
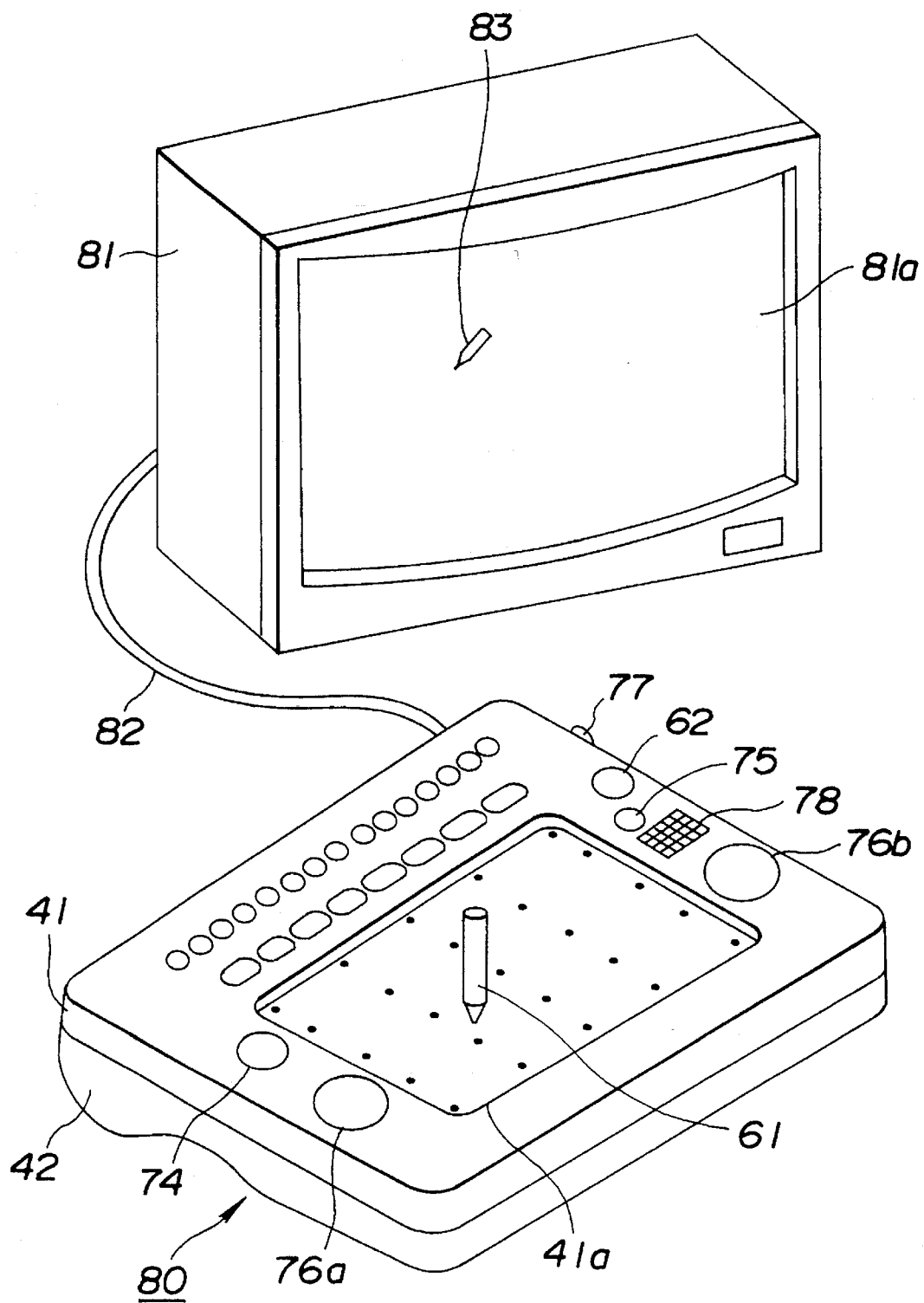
FIG. 3 is a perspective view showing a system configuration of the graphic image generating apparatus shown in FIG. 1.

The system configuration of the present embodiment, in which the present invention is applied to a graphic computer employed by children for preparing drawings for play, is explained by referring to FIG. 3.

In this figure, a graphic computer 80 fitted with a video signal output terminal is connected via a video cable 82 to a display 81 fitted with a video signal input terminal. The graphic computer 80 has its housing made up of an upper casing 41 and a lower casing 42, and a power switch 77 is provided on an upper part of the right lateral surface of the upper casing 41. A cancellation button 62, a speech adjustment unit 75 and a radiator 78 sheathing a speaker, not shown, are provided at a right-side end on the upper surface of the upper casing 41. A clear button 74 is provided at a left-side end on the upper surface of the upper casing 41. Execute buttons 76a, 76b are provided at both sides on the upper surface of the upper casing 41. Of the switches provided on the upper surface of the upper casing 41, the cancellation button, sound volume adjustment unit, 75, clear button 74 and the execute buttons 76a, 76b are independent mechanical buttons, and are termed key switches in the present embodiment.

The upper casing 41 is formed with a central rectangular cut-out region 41a below which is provided the aforementioned tablet 12 as a coordinate input surface of the pressure sensitive position detection unit 43.

By way of the basic operation of the above-described system, if, with the execute button 76a or 76b pressed, the tip end of an accessory pen 61 of a plastic material for inputting coordinate data is lightly pressed onto the tablet 12 and moved to delineate a desired trajectory, a cursor 83 in the form of a pen is continuously moved to follow the trajectory which is displayed as an image on the screen 81a of the display monitor 81. Since the execute buttons 76a, 76b are provided on both ends of the tablet 12, operation may be made easily by a left-handed child. If the clear button 74 is operated, the image on the screen 81a is erased in its entirety so that an input waiting state is set while the mode remains in the drawing mode.

Figure 4:
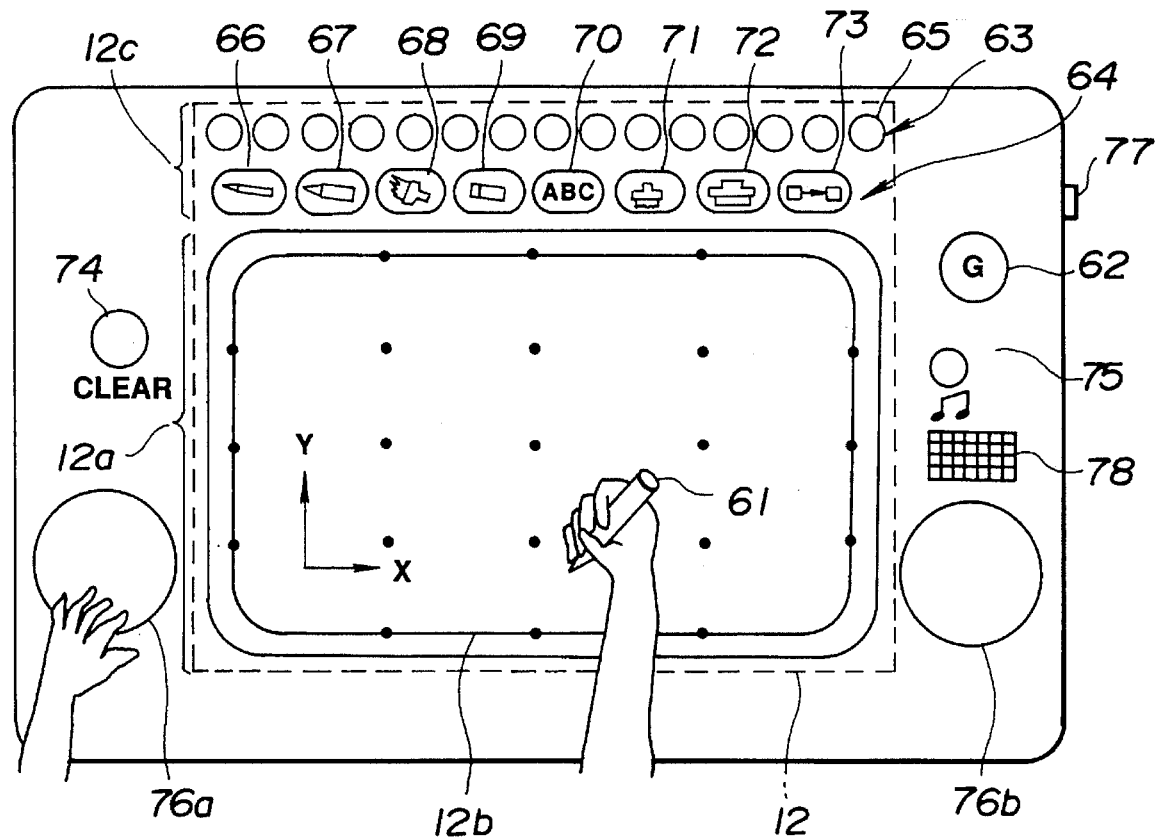
FIG. 4 is a plan view showing an embodiment of the graphic image generating apparatus shown in FIG. 1.

As best seen in FIG. 4, the tablet 12 has its coordinate inputting surface divided into a drawing area 12a and a menu selecting area 12c, and a drawing area proper 12b, provided with black circles at a predetermined pitch, is provided within the drawing area 12a. The aspect ratio of the drawing area proper 12b is matched to the aspect ratio of 3:4 of a usual monitor screen 81a. The pixel ratio, which is the ratio of the resolution in the longitudinal direction (Y-direction) to that in the transverse direction (X-direction) of input coordinates of the tablet 12 is matched to the pixel ratio of the usual monitor screen 81a. Consequently, in the present embodiment if a trajectory of a true circle is drawn in the drawing area proper 12b, an image of a corresponding true circle is displayed on the screen 81a of the display 81.

The menu selecting area 12c of the tablet 12 is subdivided into a color selecting sub-area 63 and a tool selecting sub-area 64. The color selecting sub-area 63 is provided with 15 circular holes 65 while the tool selecting area 64 is provided with 8 elongate holes 66 to 73. By lightly touching one of the circular holes 65 of the tablet 12, a selected one of 15 different colors (white, yellow, skin, orange, pink, red, purple, blue, light blue, light purple, yellowish green, green, light brown, gray and black) may be designated, whereas, by lightly touching one of the 8 elongate holes 66 to 73, one of the eight different tools, that is fine line, thick line, brush, plastic erasure, ABC stamp, pattern stamp, larger stamp and stamp enlarged, may be designated. Which of the fifteen round holes or which of the eight elongate holes has been selected may be known by input coordinates to tablet 12.

In this manner, the voltages ($V_x$, $V_y$), associated with input coordinates (X, Y), which are data based on first coordinate signals, as detected by the coordinate detection unit 23, are converted by A/D converter 16 into digital signals, which are fetched by CPU 13. If the voltages ($V_x$, $V_y$), associated with the input coordinates (X, Y), are included within the drawing area proper 12b of the tablet 12, the data based on the coordinates (X, Y) are written in RAM 14 as the first storage unit. On the other hand, if the voltages ($V_x$, $V_y$) are in register with coordinates (X, Y) within the menu selecting area 12c, CPU 13 decides, based on the coordinates (X, Y), which one of the round holes 65 and the elongated holes 66 to 73 is thrust, and writes color data of tool data associated with the thus identified buttons (round or elongated holes) in RAM 14. If the tool buttons 66 to 73 are selected, CPU 13 also executes an operation matched to the selected tool.

Based on instructions from CPU 13, VDP 18 reads data of input coordinates (X, Y) and color data from RAM 14 to write color image data in associated addresses of VRAM 19, while periodically reading out 1-frame of color image data from VRAM 19 to supply the read out data to an NTSC encoder 20. The NTSC encoder sequentially converts the Color image data supplied thereto into composite image signals which are then supplied to video signal output terminal 21. Since VRAM 14 in the present embodiment has a storage capacity of two pages, VDP 18 writes and reads image data in a page-1 area during a first procedure and transfers the page-1 data in their entirety to a page-2 area to write and read the image data in the page-2 area.

If, when the cancellation button 62 on the Upper casing 41 is pressed, CPU 13 commands a cancel command to VDP 18, the latter again reads the image data in the page-1 area, while Writing image data in the page-1 area when a coordinate input is made. This means that the image displayed on the screen 81a of the monitor 81 reverts to the image of the directly preceding procedure by the operation of the cancellation button 62. Consequently, the directly previous image may be restored by a one-touch operation when a mistaken image has been drawn during the drawing operation.

It is noted that counter 22 perpetually counts clock pulses CK of CPU 13 and incidentally clears the counted value by clear pulses from CPU 13. When the count value in counter 22 reaches a 5-minute value, that is if no clear pulse is supplied for five minutes from CPU 13, counter 22 issues an alarm signal AL to CPU 13. During the usual drawing mode, CPU 13 is responsive to the alarm signal AL to issue an alarm operating signal to alarming circuit 24 via I/O interface 17. The alarming circuit 24 is responsive to the alarming operating signal from CPU 13 to supply a signal corresponding to a predetermined sound, melody or message to speaker 25 for two minutes. The counter 22, alarming circuit 24 and speaker 25 issue an alarming sound to the user, for example when the user has forgot to turn off the power supply. The alarming circuit 24 may be used via I/O interfacing circuit 17 not only for the alarming operation but also for an ordinary sound radiating operation. That is, the alarming circuit 24 is actuated for radiating a predetermined touch sound via speaker 25 when the user has designated the color selecting buttons 65 or the tool selecting buttons 66 to 73. The sound volume of the alarming sound or the touch sound may be adjusted by a speech adjustment unit 75 on the upper casing 41.

The operation of the present embodiment is explained.

When the graphic computer 80 of the present embodiment is to be in use, the video signal output terminal of the graphic computer 80 is connected to the video signal input terminal of the display 81 via video cable 82. If the user sets power switch 77 on, power turn-on detection unit 26 detects it to transmit a power source turn-on signal to CPU 13 via I/O interface 17. CPU 13 controls ROM 11 to display a demonstration image indicating an example of use of the graphic computer 80 of the present embodiment on the screen 81a of the monitor 81.

The image generating program is hereinafter explained. The pre-set sequence of the steps of the image generating program means the following.

The coordinate (X, Y), color data and the tool data are usually written in RAM 14 on the basis of the coordinate information as detected by the coordinate detection unit 23 by the operation of the tablet 12, as described previously. Under the instructions of CPU 13, VDP 18 reads the input coordinate data (X, Y) and color data from RAM 14 to write the color image data in VRAM 19.

On the other hand, execution by the CUP 13 of the image-generating program stored in ROM 11 directly automatically generates the data of the input coordinate (X, Y) and color data to write the data directly in RAM 14, in accordance with the instructions by CPU 13, in place of data from tablet 12. Consequently, the images are sequentially generated on the screen 81a as if the table 12 were operated by the user. Specifically, a pen 83 as a cursor is displayed on the screen 81a to draw a prescribed picture, or a plastic eraser as a cursor is displayed on the screen to erase the picture.

This demonstration image sequentially displays the functions that may be achieved by the graphic computer. This enables the user to learn the method of using the graphic computer 80 as the image generating apparatus.

If one of the fifteen round holes 65, the eight elongated holes 66 to 73 on tablet 12, the cancellation button 62, clear button 74 and the execute buttons 76a, 76b on the upper casing 41 is pressed, coordinate detection unit 23 and the key switch pressure detection unit 27 detect the pressure information of the buttons on the tablet and the key switches to transmit the detected information to CPU 13. Under control of CPU 13, execution of the above-described sequence of the image generating operation, that is demonstration display mode, may be terminated. The image data generated automatically up to this time is maintained in RAM 14 as the image storage means and image data of the trajectory drawn on tablet 12 by a manual operation may be added to the image data held by RAM 14.

Figure 5:
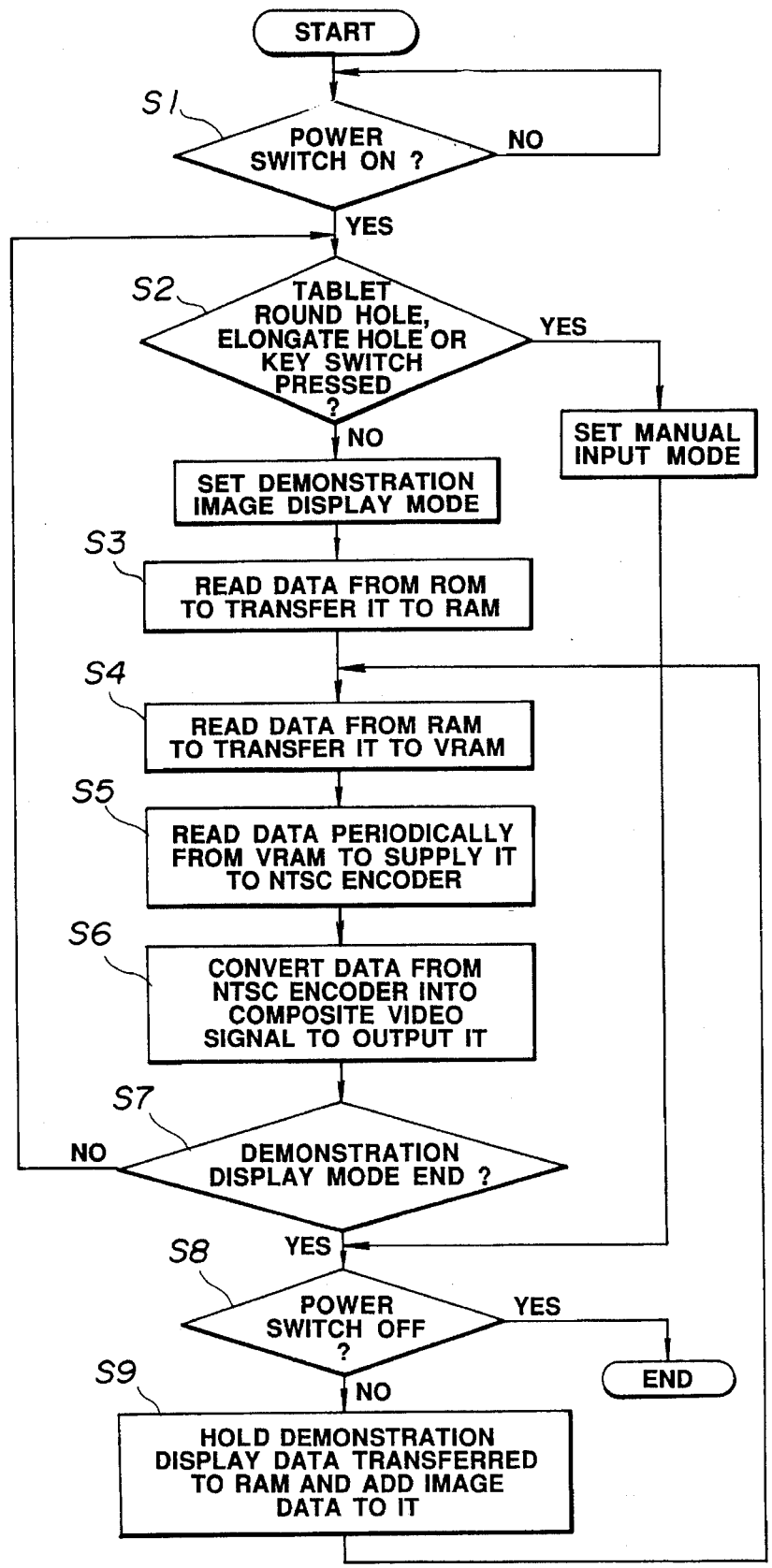
FIG. 5 is a flow chart for illustrating the operation of the apparatus shown in FIG. 1.

The above-described sequence of operations is described by referring to a flow chart shown in FIG. 5. Throughout this flow chart, commands and decision are issued by CPU 13.

When the flow chart is started, it is checked at step S1 by power source turn-on detection unit 26 whether or not the power source switch 77 has been turned on. If the result is YES, control proceeds to step S2 and, if otherwise, control reverts to step S1.

At step S2, it is checked whether or not one of the fifteen round holes 65 in the color selection sub-area 63 in the menu selection area 12c, eight elongated holes 66 to 73 in the tool selection sub-area 64 in the menu selecting area 12c, cancellation button 62, clear button 74 and the execute buttons 76a, 76b on the upper casing 41, has been pressed. If the result is YES, a manual input mode is set, so that control proceeds to step S8. If the result is NO, the demonstration image display mode is set, so that control proceeds to step S3.

At step S3, the demonstration image display program is read from ROM 11 in which the demonstration program is previously stored, and the image data, constituted by the coordinate input data, color data and tool data etc. is transferred to RAM 14. Control then proceeds to step S4.

At step S4, the image data transferred at step S3 to RAM 14 is read and written by VDP 18 in VRAM 119. Control then proceeds to step S5.

At step S5, the image data written in VRAM 19 at step S4 are periodically read and supplied via VDP 18 to NTSC encoder 20. Control then proceeds to step S6.

At step S6, the image data supplied from VDP 18 is converted into composite video data so as to be outputted at signal output terminal 21. Control then proceeds to step S7.

At step S7, it is checked if the demonstration display mode has come to an end. If the result is YES, control proceeds to step S8 and, if otherwise, control reverts to step S2.

That is, in the demonstration image display mode, the trajectory information is sequentially displayed based on the movement of cursor 83. By repetition of the loop S2 to S7, the demonstration image as a moving picture may be viewed on screen 81a. After display of the sequence of the operating functions, an end flag, for example, is generated to indicate to CPU 13 that the demonstration image display mode has come to an end.

At step S8, it is checked if power source switch 77 is turned off. If the result is YES, the flow is terminated. At this step S8, it is determined if, after decision of the result of discrimination of YES, that is after the decision that the demonstration display is to be terminated, the power source is to be turned off without doing anything, or the operation by the user of adding an original picture to the image as displayed at a time point of termination of the demonstration display brought about by the result of NO, is to be initiated.

At step S9, the manual operation input mode is set, in which the user adds an original picture etc. to an image which exists at a time point when step S8 gives a decision No, that is at a time point when, after selecting YES at step S2, the demonstration display is discontinued without doing anything. Specifically, while the demonstration display data transferred to RAM 14 by the repetition of the loop S2 to S7 up to the time when one of the fifteen round holes 65, the eight elongated holes 66 to 73 on tablet 12 or the cancellation button 62, clear button 74 and the execute buttons 76a, 76b on the upper casing 41 is pressed, is maintained, the image data entered to the image data from tablet 12 is added to the demonstration program image data. Control then reverts to step S4 to display the image on the screen 81a of the monitor 81 by the operation of the steps S5 and S6.

Meanwhile, the above-mentioned end flag, indicating the end of the demonstration image display mode, continues to be generated when the result of decision of step S2 is YES. In this manner, the operation of displaying the image on the screen 13a by the continued operation of tablet 12 is performed by the repetition of the loop S4 to S9. The flow chart is completed when the power turn-off is detected at step S8.

If the user desires to generate an image from the outset, that is if it is desired by the user to generate an image on the screen 81a of display 81 where no image is displayed, instead of adding an image to the demonstration display which is interrupted halfway, it suffices to press the clear button 74 directly after the power switch 77 is turned on. Alternatively, the manual input may be established on actuation of the key switches or the tablet.

In this manner, it is possible with the present embodiment to interrupt the demonstration display program, which is automatically executed on turning on of the power source to permit the user to add a picture to the demonstration display which is interrupted halfway, thus enabling the picture pattern realized on the screen to be enriched to help a user to create an original picture.

It is to be noted that the present invention is not limited to the above-described embodiment. For example, a plurality of programs for the image generating sequence, that is demonstration display programs, may be previously stored in ROM as the aforementioned storage means, and one of them may be arbitrarily selected buy suitable selection means. In such case, the selection means is provided as one of the key switches. Besides, although the composite video signals are directly supplied to the monitor, they may also be directly supplied to a VTR or an electronic camera for recording on a video tape or a floppy disc.

What is claimed is:

1. An interactive graphic image generating apparatus comprising:

means for handwritten input by a user, first storage means for storing data based on said handwritten input a video processor for generating image data from data from said first storage means, image storage means for storing said image data, output means for outputting video image data from said image storage means to a display, a central processing unit, an automatic demonstration image generating program indicating a sequence of operations for automatically generating a series of continuous, demonstration images, wherein said automatic demonstration image generating program demonstrates to said user how an image is drawn, a second storage means for storing said automatic demonstration image generating program, means for halting said automatic demonstration image generating program, wherein an image generated by the automatic demonstration image generating program up until said user activates said means for halting said automatic demonstration image generating program, remains on said display to allow said user to modify said image by using said means for handwritten input, wherein the central processing unit sequentially generates second coordinate signals based on execution of said automatic demonstration image generating program, and said image storage means stores both image data generated on the basis of said handwritten input and image data generated on the basis of said second coordinate signals for simultaneously displaying both of said image data on said display.

2. The interactive graphic image generating apparatus as claimed in claim 1 wherein said means for handwritten input comprises a tablet for generating (X,Y) cartesian coordinate data by the operation of an (X,Y) cartesian coordinate input surface coupled to said tablet, and wherein said first storage means, second storage means and said image storage means comprise a RAM, a ROM, and a video RAM, respectively.

3. The interactive graphic image generating apparatus as claimed in claim 1 wherein said means for handwritten input comprises (X,Y) cartesian coordinate position information inputting means for generating (X,Y) cartesian coordinate information by a manual operation by user and (X,Y) cartesian coordinate detection means for generating first coordinate signals from said (X,Y) cartesian coordinate information, and wherein the first storage means for storing data based on said handwritten input stores data based on said first coordinate signals.

4. A graphic image generating apparatus comprising:

coordinate position information inputting means for generating coordinate information by a manual operation by user, coordinate detection means for generating first coordinate signals from said coordinate information, first storage means for storing data based on said first coordinate signals, a video processor for generating image data from data from said first storage means, image storage means for storing said image data, output means for outputting video image data from said image storage means to a display, a central processing unit, second storage means for storing an automatic demonstration image generating program indicating a sequence of operations for automatically generating a series of continuous, demonstration images, wherein the central processing unit sequentially generates second coordinate signals based on execution of said automatic demonstration image generating program, said image storage means stores both image data generated on the basis of said first coordinate signals and image data generated on the basis of said second coordinate signals for simultaneously displaying both of said image data on said display, starting means for instructing staffing of execution of said automatic demonstration image generating program, terminating means for instructing termination of execution of said automatic demonstration image generating program, said central processing unit proceeding to a demonstration graphic image generating mode when said automatic demonstration image generating program is started by said starting means, said central processing unit also establishing the state of holding of an image automatically generated by execution of said automatic demonstration image generating program up to the time point of termination in said image storage means, when the execution of said automatic demonstration image generating program is terminated by said terminating means, at the same time that said central processing unit proceeds to a hand-written data input mode capable of writing an image based on coordinate data inputted by a manual operation by said coordinate position information input means to said image storage means.

5. A graphic image generating apparatus comprising:

coordinate position information inputting means for generating coordinate information by a manual operation by user, coordinate detection means for generating first coordinate signals from said coordinate information, first storage means for storing data based on said first coordinate signals, a video processor for generating image data from data from said first storage means, image storage means for storing said image data, output means for outputting video image data from said image storage means to a display, a central processing unit, second storage means for storing an automatic demonstration image generating program indicating a sequence of operations for automatically generating a series of continuous, demonstration images, wherein the central processing unit sequentially generates second coordinate signals based on execution of said automatic demonstration image generating program, said image storage means stores both image data generated on the basis of said first coordinate signals and image data generated on the basis of said second coordinate signals for simultaneously displaying both of said image data on said display, starting means for instructing starting of execution of said automatic demonstration image generating program, terminating means for instructing termination of execution of said automatic demonstration image generating program, said central processing unit proceeding to a demonstration graphic image generating mode when said automatic demonstration image generating program is started by said starting means, said central processing unit also establishing the state of holding of an image automatically generated by execution of said automatic demonstration image generating program up to the time point of termination in said image storage means, when the execution of said automatic demonstration image generating program is terminated by said terminating means, at the same time that said central processing unit proceeds to a hand-written data input mode capable of writing an image based on coordinate data inputted by a manual operation by said coordinate position information input means to said image storage means, and a power source switch, said starting means including said power source switch and said automatic demonstration image generating program being started to be executed based on turning on of at least said power switch.

6. A graphic image generating apparatus comprising:

coordinate position information inputting means for generating coordinate information by a manual operation by user, coordinate detection means for generating first coordinate signals from said coordinate information, first storage means for storing data based on said first coordinate signals, a video processor for generating image data from data from said first storage means, image storage means for storing said image data, output means for outputting video image data from said image storage means to a display, a central processing unit, second storage means for storing an automatic demonstration image generating program indicating a sequence of operations for automatically generating a series of continuous, demonstration images, wherein the central processing unit sequentially generates second coordinate signals based on execution of said automatic demonstration image generating program said image storage means stores both image data generated on the basis of said first coordinate signals and image data generated on the basis of said second coordinate signals for simultaneously displaying both of said image data on said display, starting means for instructing starting of execution of said automatic demonstration image generating program, terminating means for instructing termination of execution of said automatic demonstration image generating program, said central processing unit proceeding to a demonstration graphic image generating mode when said automatic demonstration image generating program is started by said starting means, said central processing unit also establishing the state of holding of an image automatically generated by execution of said automatic demonstration image generating program up to the time point of termination in said image storage means, when the execution of said automatic demonstration image generating program is terminated by said terminating means, at the same time that said central processing unit proceeds to a hand-written data input mode capable of writing an image based on coordinate data inputted by a manual operation by said coordinate position information input means to said image storage means, wherein said terminating means includes said coordinate position information input means or an arbitrary key switch, said automatic demonstration image generating program ceasing to be executed based on actuation of said coordinate position information input means or said arbitrary key switch.

7. An interactive graphic image generating apparatus comprising:

means for handwritten input by a user, first storage means for storing data based on the handwritten input, a video processor for generating image data from data from the first storage means, image storage means for storing the image data, display means for displaying a video image in the form of a trajectory based on data from the image storage means, a central processing unit, an automatic demonstration image generating program indicating a sequence of operations for automatically generating a series of continuous, demonstration trajectory images, wherein said automatic demonstration image generating program demonstrates to said user how a graphic image is displayed, a second storage means for storing said automatic demonstration image generating program, means for halting said automatic demonstration image generating program, wherein an image generated by the automatic demonstration image generating program up until said user activates said means for halting said automatic demonstration image generating program, remains on said display to allow said user to modify said image by using said means for handwritten input, wherein the central processing unit sequentially generates second coordinate signals based on execution of said automatic demonstration image generating program, and said image storage means stores both image data generated on the basis of said handwritten input and image data generated on the basis of the second trajectory coordinate signals, and the display means simultaneously displays all of the generated image data stored in the image storage means.

8. The interactive graphic image generating apparatus as claimed in claim 7 wherein the means for handwritten input comprises a tablet for generating trajectory (X,Y) cartesian coordinate data by the operation of a trajectory (X,Y) cartesian coordinate input surface coupled to said tablet, upon which a stylus is pressed.

9. The interactive graphic image generating apparatus as claimed in claim 7 wherein said means for handwritten input comprises (X,Y) cartesian coordinate position information inputting means for generating trajectory (X,Y) cartesian coordinate information by a manual operation by user and (X,Y) cartesian coordinate detection means for generating first trajectory coordinate signals from the trajectory (X,Y) cartesian coordinate information, and wherein the first storage means for storing data based on said handwritten input stores data based on said first trajectory coordinate signals.

10. A graphic image generating apparatus comprising:

coordinate position information inputting means for generating trajectory coordinate information by a manual operation by user, coordinate detection means for generating first trajectory coordinate signals from the trajectory coordinate information, first storage means for storing data based on the first trajectory coordinate signals, a video processor for generating image data from data from the first storage means, image storage means for storing the image data, display means for displaying a video image in the form of a trajectory based on data from the image storage means, a central processing unit, second storage means for storing an automatic demonstration image generating program indicating a sequence of operations for automatically generating a series of continuous, demonstration trajectory images, wherein the central processing unit sequentially generates second trajectory coordinate signals based on execution of the automatic demonstration image generating program, the image storage means stores both image data generated on the basis of the first trajectory coordinate signals and image data generated on the basis of the second trajectory coordinate signals, the display means simultaneously displays all of the generated image data stored in the image storage means, starting means for initiating execution of the automatic demonstration image generating program by the central processing unit, and terminating means for terminating execution of the automatic demonstration image generating program by the central processing unit, wherein the central processing unit maintains in the image storage means an image automatically generated by execution of the automatic demonstration image generating program up to the time point when the execution of the automatic demonstration image generating program is terminated by the terminating means, at the same time that the central processing unit proceeds to a hand-written data input mode capable of writing to the image storage means trajectory image data based on trajectory coordinate data inputted by a manual operation by the trajectory coordinate position information input means.

11. A graphic image generating apparatus comprising:

coordinate position information inputting means for generating trajectory coordinate information by a manual operation by user, coordinate detection means for generating first trajectory coordinate signals from the trajectory coordinate information, first storage means for storing data based on the first trajectory coordinate signals, a video processor for generating image data from data from the first storage means, image storage means for storing the image data, display means for displaying a video image in the form of a trajectory based on data from the image storage means, a central processing unit, second storage means for storing an automatic demonstration image generating program indicating a sequence of operations for automatically generating a series of continuous, demonstration trajectory images, wherein the central processing unit sequentially generates second trajectory coordinate signals based on execution of the automatic demonstration image generating program, the image storage means stores both image data generated on the basis of the first trajectory coordinate signals and image data generated on the basis of the second trajectory coordinate signals, the display means simultaneously displays all of the generated image data stored in the image storage means, starting means for initiating execution of the automatic demonstration image generating program by the central processing unit, terminating means for terminating execution of the automatic demonstration image generating program by the central processing unit, wherein the central processing unit maintains in the image storage means an image automatically generated by execution of the automatic demonstration image generating program up to the time point when the execution of the automatic demonstration image generating program is terminated by the terminating means, at the same time that the central processing unit proceeds to a hand-written data input mode capable of writing to the image storage means trajectory image data based on trajectory coordinate data inputted by a manual operation by the trajectory coordinate position information input means, and a power source switch, the starting means including the power source switch and the automatic demonstration image generating program being started by turning on at least the power switch.

12. A graphic image generating apparatus comprising:

coordinate position information inputting means for generating trajectory coordinate information by a manual operation by user, coordinate detection means for generating first trajectory coordinate signals from the trajectory coordinate information, first storage means for storing data based on the first trajectory coordinate signals, a video processor for generating image data from data from the first storage means, image storage means for storing the image data, display means for displaying a video image in the form of a trajectory based on data from the image storage means, a central processing unit, second storage means for storing an automatic demonstration image generating program indicating a sequence of operations for automatically generating a series of continuous, demonstration trajectory images, wherein the central processing unit sequentially generates second trajectory coordinate signals based on execution of the automatic demonstration image generating program, the image storage means stores both image data generated on the basis of the first trajectory coordinate signals and image data generated on the basis of the second trajectory coordinate signals, the display means simultaneously displays all of the generated image data stored in the image storage means, starting means for initiating execution of the automatic demonstration image generating program by the central processing unit, and terminating means for terminating execution of the automatic demonstration image generating program by the central processing unit, wherein the central processing unit maintains in the image storage means an image automatically generated by execution of the automatic demonstration image generating program up to the time point when the execution of the automatic demonstration image generating program is terminated by the terminating means, at the same time that the central processing unit proceeds to a hand-written data input mode capable of writing to the image storage means trajectory image data based on trajectory coordinate data inputted by a manual operation by the trajectory coordinate position information input means, and wherein the terminating means includes an arbitrary key switch, the automatic demonstration image generating program ceasing to be executed based on actuation of the arbitrary key switch.

* * * * *